Figure 4:
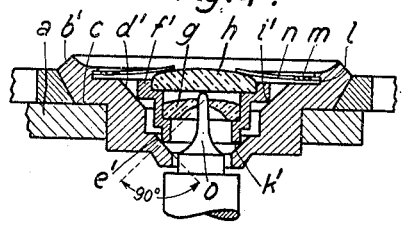

April 29, 1941.   F. MARTI   2,239,682
BEARING WITH MOVABLE BRUSH, PARTICULARLY FOR WATCH MOVEMENTS
Filed April 20, 1938   2 Sheets-Sheet 1
Fig. 1.
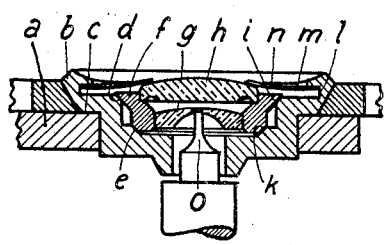
Fig. 2.
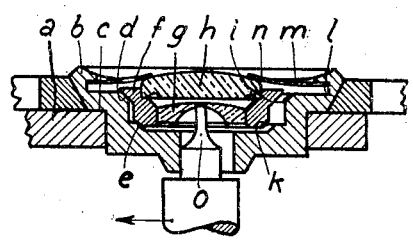
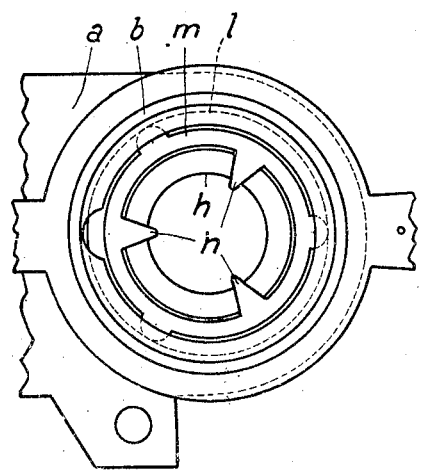
Fig. 3.
F. Marti
Inventor
By: Glascock Downing & Seebold
Attys.

F. Marti Inventor

By: Glascock Downing & Seebold
Attys.

Patented Apr. 29, 1941

2,239,682

UNITED STATES PATENT OFFICE 2,239,682

BEARING WITH MOVABLE BUSH, PARTICULARLY FOR WATCH MOVEMENTS

Fritz Marti, La Chaux-de-Fonds, Switzerland

Application April 20, 1938, Serial No. 203,158
In Switzerland April 21, 1937

4 Claims. (Cl. 58—140)

The present invention relates to a bearing with movable bush particularly for watch movements.

In watchmaking there are bearings the movable bush of which is held in place by a spring which returns this bush into its normal position when, for instance under the effect of a shock, said bush has been displaced from its normal centered position.

Such movable bushes have generally a conical portion resting in a corresponding hollow of the bearing which serves as a centering means and into which the mentioned spring returns the bush after an accidental displacement.

It often becomes necessary for the sake of effecting an efficient operation to select for the movable bush in question a diameter which is not easy but even difficult to lodge into the cock of a watch movement. This dimensioning is also influenced by the fact that, for obtaining an exact centering of the bushes after an accidental displacement of the same, the contact surfaces between the movable bush and the body of the bearing must have a certain configuration. Simple chamfered edges do not suffice for a correct operation of the device.

The object of the present invention is to provide a bearing with a movable stone setting bush, especially for watch movements in which the surfaces of contact, which in this particular case may also be called "centering surfaces" are arranged so that the general diameter of the bush may be considerably reduced. In the bearing with a movable stone setting bush member the latter contacts the body of the bearing with two surfaces which are provided each at one of the ends of the bush and whereof one at least is conical. This division and stepping of the centering members makes possible the arrangement of the different surfaces one above the other, so as to reduce the diameter of the bearing to dimensions which in watch making admit a more general use of the device without diminishing the efficiency.

The accompanying drawings show six forms of the present invention. All figures except Fig. 3, which is a plan view are sections taken on the axis of the bore of the bearings. Figs 1, 4, 6, 8, 10 and 12 show the bush in its normal centered position, while Figs. 2, 5, 7, 9, 11 and 13 show the bush in a displaced position caused by a shock coming from the outside.

Throughout the figures like characters of reference denote corresponding parts.

In the embodiment according to the Figures 1, 2 and 3 $a$ designates the plate of the cock within which the bearing is mounted. In this particular case the bearing includes a cylindrical body $b$ forced into a bore of the plate of the cock upon which it rests with a shoulder $c$.

Conical surfaces $d$ and $e$ are formed on the bore of this circular body by two chamfered edges arranged step-wise one above the other.

Arranged within the body member is a movable bush member $f$ having a setting into which a hole-stone $g$ has been forced and a sinking in which a cap stone $h$ rests. This bush member possesses two conical surfaces $i$ and $k$ cooperating with the surfaces $d$ and $e$ of the body of the bearing. This latter is provided at its upper part with a groove or recess $l$ into which an elastic member $m$ has been introduced which rests with one end in said groove and bears with its other end by means of tongues $n$ upon the cap stone $h$. This spring $m$ presses the movable bush member against the body member; the centering surfaces $d$ and $e$, and respectively $k$ and $i$ have the same conicalness. This pressure which is regularly imposed upon the whole surface of the cap stone centers the bush member exactly within the conical seats of the body member of the bearing. The conical surface $i$ is located at the upper end of the bush and the surface $k$ at the lower end of the same. This stepped arrangement of one of these surfaces above the other has a great influence on the steadiness and on the working of the bearing. Thus it happens, that, as is seen from Fig. 2, when a shock has been given to the watch which is too violent for being received without a risk for the pivot $o$ of the wheel seated in the bearing, the bush slides along a conical surface against the elastic effect of the tongues $n$, but remains always parallel to its normal position of rest and will therefore never be exposed to a bending stress.

The arrangement of the stepped surfaces also permits a substantial reduction of the outside diameter of the bearing for a given size of stone. This facilitates greatly the use of a bearing of the described kind in small watch movements.

Figure 5:
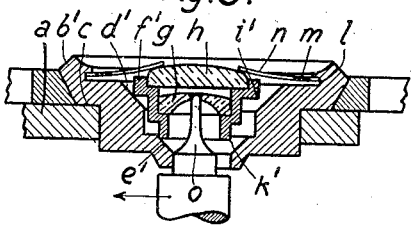

In the embodiment according to Figures 4 and 5 the movable bush member $f'$ has a setting into which has been forced a hole-stone $g$ and a sinking in which a cap stone $h$ rests.

The bore of the body $b'$ of the bearing possesses at its upper part a groove $l$ into which an annular spring $m$ has been introduced the outer edge being held in said groove while the inner edge is provided with tongues $n$ which are tensioned upon the cap stone $h$. The bush member $f'$ rests freely within the body of the bearing $b'$ by means of two conical faces $d'$ and $e'$ which cooperate with the annular edges $i'$ and $k'$.

In the two embodiments represented in Figures 4, 5, 6 and 7 the body member $b'$ of the bearing is provided with two conical stepped surfaces $d'$ and $e'$ which cooperate with two annular stepped edges $i'$ and $k'$ of the bush member. The lower conical surface $e'$ is adjusted at 90° of a rotary cone the generatrix of which passes through the center of the hole of the hole stone $g$ and through the contact circle between the annular edge $k'$ and the said conical surface $e'$. In the Fig. 4 the upper conical surface $d'$ is also carefully adjusted so as to present a conicalness identical with that of the lower surface $e'$ so that there is no play in the normal position of the bush member between the annular edge $i'$ and the upper conical surface $d'$.

Figure 6:
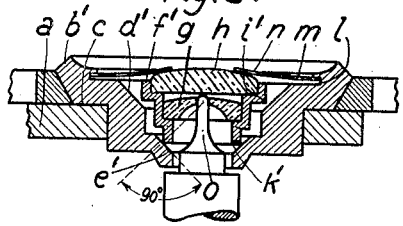
Figure 7:
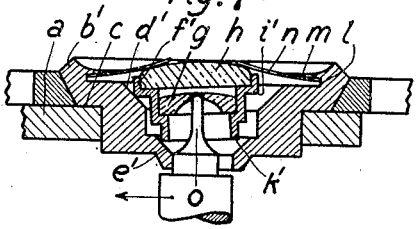

In Fig. 6 the upper conical surface $d'$ does not contact with the bush and leaves a certain play between it and the edge $i'$ with which it cooperates only in the case of a lateral displacement of the setting bush member thus acting as a guide.

Figure 8:
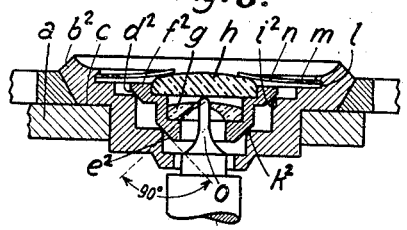
Figure 9:
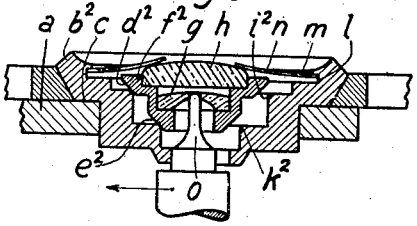
Figure 10:
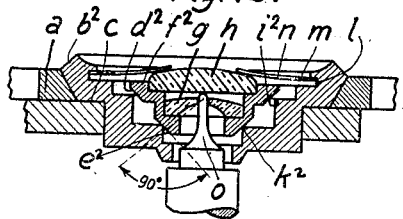
Figure 11:
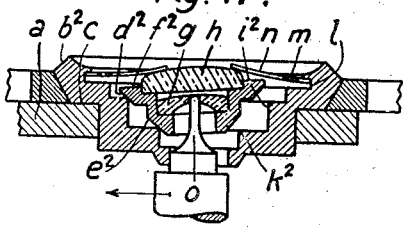
Figure 12:
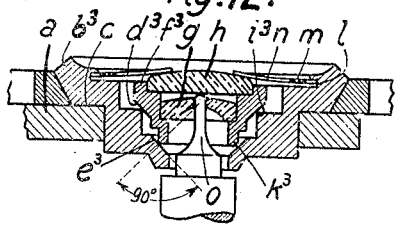
Figure 13:
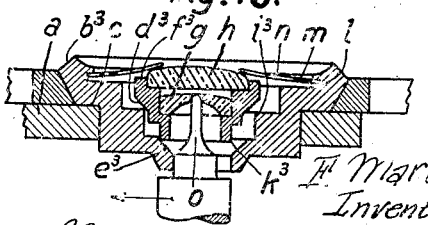

The two embodiments represented by Figs. 8, 9, 10 and 11 differ from the preceding in that the bush member $f^2$ which is provided with two conical surfaces $d^2$ and $e^2$, while the body $b^2$ of the bearing presents two annular edges $i^2$, $k^2$ cooperating with $d^2$, $e^2$. The lower conical surface $e^2$ is carefully adjusted in these two cases like that in the two cases of Figs. 4 and 6. In Fig. 8 the upper conical surface $d^2$ is also adjusted so as to leave no play between it and the edge $i^2$ of the body of the bearing which cooperates with it in all positions of the bush member. In Fig. 10 this surface $d^2$ is not adjusted and leaves a play between it and the edge $i^2$ so that it does not cooperate with it except when the bush member is laterally displaced. Then it will serve as a guiding surface. In another embodiment according to Figs. 12 and 13 the bush member $f^3$ has an upper conical surface $d^3$ and a lower annular edge $k^3$, while the body $b^3$ of the bearing cooperates with it by an upper annular edge $i^3$ and a lower conical surface $e^3$.

The adjustment of the lower conical surface perpendicularly to the surface of a rotary cone the generatrix of which passes through the center of the hole of the hole-stone $g$ permits the pivot $o$ to be perfectly centered even if owing to an accidental play between the conical upper guiding surface and the corresponding edge, the bush or setting member should still remain slightly inclined.

Of course the edges, be they on the setting member or on the body of the bearing, may be slightly rounded off or chamfered.

If the watch receives a heavy shock the bush or setting member $f$ slides towards the opposite side to that from which the shock comes while the conical surfaces serve as guiding surfaces for the annular edges and the bush or setting member will be lifted laterally with a combined radial and axial movement against the spring tongues $n$. The top of the pivot $o$ is therefore not subjected to a bending stress. The tongues $n$ absorb the shock and tend to bring the bush or setting member back into its normal position upon its seat.

The body $b$ of the bearing may be formed so as to serve at the same time for supporting the index.

What I claim is:

1. A bearing for watch movements comprising a circular body member having a central bore provided with at least two stepped surfaces located near the respective ends and having a cylindrical outside portion provided with a shoulder, the cylindrical portion being adapted to be pressed onto a plate of a cock with the shoulder against the plate, a removable bush member arranged loosely in the said central bore and provided with at least two stepped surfaces located near the respective ends thereof for coacting with the corresponding stepped surfaces in the bore, at least one of said stepped surfaces near the respective ends of said members being conical, and a spring member fixed to the body member to hold the bush member in position.

2. A bearing in accordance with claim 1, in which the two uppermost and the two lowermost stepped surfaces on the body member and on the bush member are conical.

3. A bearing according to claim 1 in which at least the upper and lower stepped surfaces on only one of said members are conical.

4. A bearing according to claim 1, in which one of the stepped surfaces on each of said members is conical, and said conical surfaces being located at remote ends of said members.

FRITZ MARTI.